Feb. 13, 1934.   O. U. ZERK   1,947,145
TIRE COVER
Original Filed July 23, 1931   2 Sheets-Sheet 1

INVENTOR:
Oscar U. Zerk
BY Slough & Canfield
ATTORNEYS

Feb. 13, 1934.  O. U. ZERK  1,947,145
TIRE COVER
Original Filed July 23, 1931   2 Sheets-Sheet 2
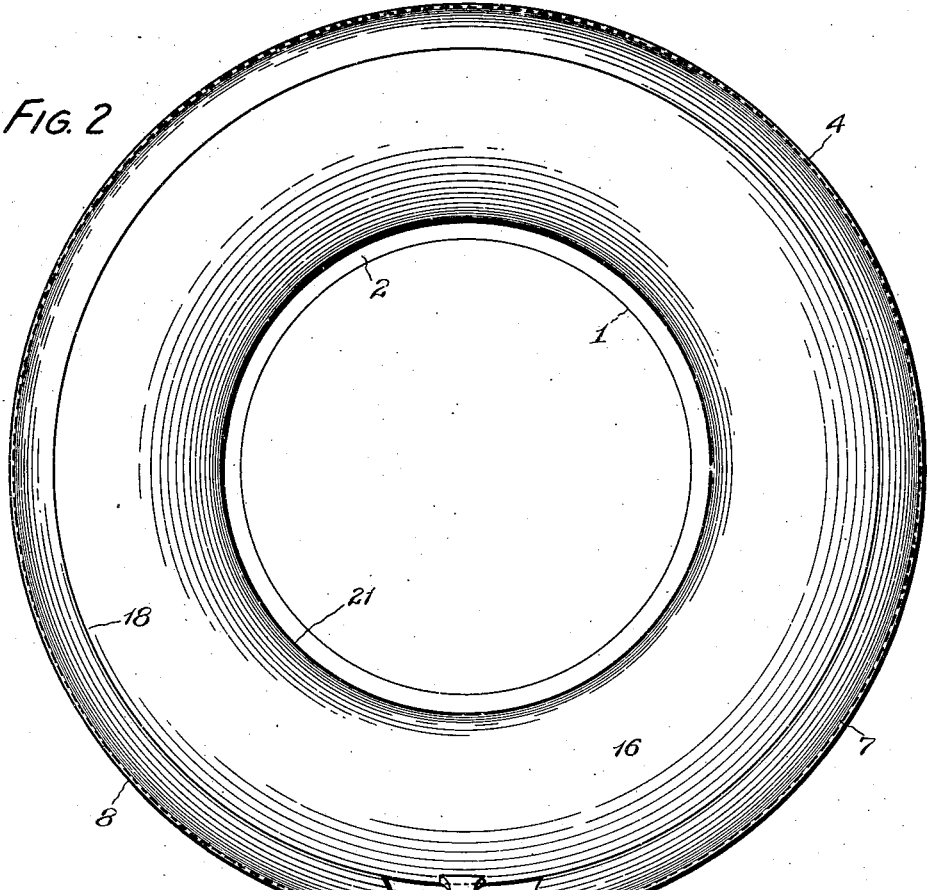
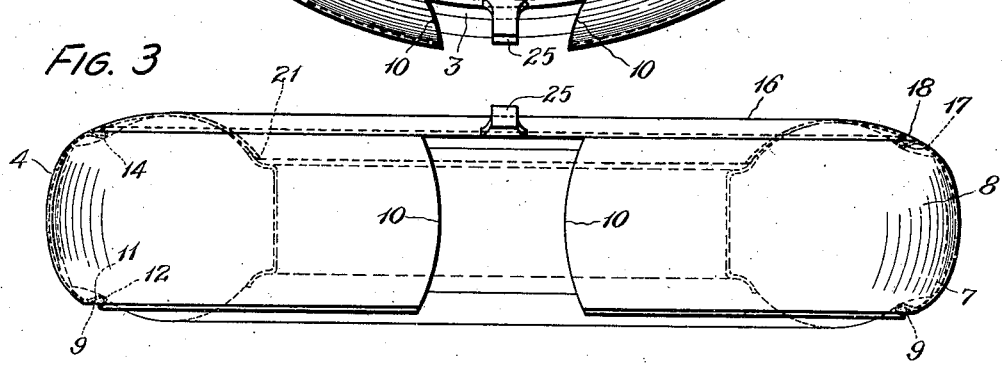
INVENTOR:
BY  Oscar. U. Zerk
Slough + Canfield
ATTORNEYS Patented Feb. 13, 1934

1,947,145

UNITED STATES PATENT OFFICE 1,947,145

TIRE COVER

Oscar U. Zerk, Cleveland, Ohio

Original application July 23, 1931, Serial No. 552,636. Divided and this application April 2, 1932, Serial No. 602,816. Renewed July 31, 1933

20 Claims. (Cl. 150—54)

My invention relates generally to tire covers for spare tires of automobiles or other vehicles, and relates more particularly to tire covers which are resilient and flexible.

The tire covers of the prior art have uniformly been made of fabric or of metal. In my copending application, Serial No. 552,635, filed July 23, 1931, I have set forth the well known inconveniences, objections and disadvantages of such prior fabric tire covers and metal tire covers. Among the disadvantages therein set forth are that the fabric covers, being made of a number of pieces, fit the tire unevenly and present an unsightly appearance and are ill adapted to be taken up in size to accommodate them to the wear of a tire. Furthermore, the fabric covers cannot in a practical manner be made to fit the cover sufficiently closely to keep out moisture, dust, and the like.

Among the objections to metal tire covers set forth in said application are the liability of the cover to be dented and otherwise mutilated and rendered unsightly upon even slight collisions therewith and even upon handling the covers in removing them from and replacing them on a tire.

In the above mentioned pending application, I have shown and described a tire cover which overcomes these disadvantages, being made entirely of rubber. Such tire covers, as set forth in that application, may have the exposed surfaces thereof formed to present a pleasing appearance and, being of rubber, will retain their shape and appearance without mutilation under impacts of collision and other shocks, and the rubber being resilient, the tire cover may constrictingly grip the tire to be covered and retain itself securely on the tire and seal it against the ingress of dirt and moisture.

In the instant application, I show and describe a tire cover made partly of rubber and partly of metal. As will appear hereinafter, rubber is employed in those parts which are exposed to collision and shock, and the constricting resilience of the rubber is employed to cause the tire cover to fit the tire and to retain it thereon, and metal is employed in other parts, preferably on the exposed circumferential surface to give the desired finish of metallic luster.

It is therefore an object of my invention to provide an improved tire cover having a rubber side portion and a metal circumferential portion, wherein the aesthetic properties of metal are suitably combined with the property of durability possessed by rubber.

Another object of my invention is to provide a composite rubber and metal tire cover wherein advantage is taken of the appearance of the metal and also the durability and resiliency of the rubber.

Another object is to provide an improved tire cover comprising a rubber portion for covering and sealing the tire in combination with a metallic circumferential portion constrictingly clamped upon the rubber portion, and interfitting in an improved manner therewith.

Another object is to provide an improved tire cover having the most desirable properties of both rubber and metal, respectively.

Another object is to provide, in a tire cover having a split metallic circumferential portion, improved means for constrictingly securing the metal portion on the tire.

Another object is to provide an improved tire cover comprising a circumferential metal portion and a rubber side portion, and to so join the side portion to the metal portion whereby by its inherent resiliency the side portion constrictingly clamps the metal portion to the tire.

Another object of my invention is to provide an improved tire cover comprising a split circumferential metal portion and a rubber side portion, with improved means for interlocking the said portions together.

Another object of my invention is to constrictingly clamp a tire cover comprising a split circumferential metal portion and resilient side portions joined to the metal portion upon a tire to be covered, in an improved manner.

Another object is to provide a tire cover comprising a split circumferential metal portion and rubber side portions so joined to the metal portion as to present a continuous flush outer ornamental surface.

Another object is to provide a tire cover comprising a circumferential metal portion and a rubber side portion, the two portions adapted to be readily joined together by mutually engaging interlocking portions, in an improved manner.

Another object of my invention is to provide an improved cover comprising a circumferential metal portion having annular grooves along the edges thereof and a rubber side portion having an integral thickened head adapted to interlock with the groove.

Another object is to provide a tire cover comprising a continuous rubber side portion formed to sealingly engage the tire rim and constrictingly joined to a metallic circumferential portion.

Another object is to provide a tire cover comprising a rubber side portion and a metallic circumferential portion, the rubber portion being formed and finished to present a glossy appearance and the circumferential portion finished to present a metallic luster.

Other objects of my invention and the invention itself will become apparent by reference to the following description of certain embodiments of my invention, and the invention itself and the drawings illustrative of said embodiments, wherein:

Fig. 1 is a medial transverse sectional view of an embodiment of my invention showing the tire cover of my invention disposed over a tire and associated rim and showing also in broken lines the normal unstressed form of resilient rubber portions of the cover and the position assumed by said portions when the cover is put on a worn tire; the cover illustrated comprising rubber portions on both sides of the tire and a metal circumferential portion;

Fig. 2 is a side elevational view of a tire having thereon the cover of Fig. 1, but drawn to a smaller scale;

Fig. 3 is a bottom view of a tire and cover, the view illustrating to a smaller scale a cover similar to that of Fig. 1 but employing only one rubber side cover portion.

Figure 1:
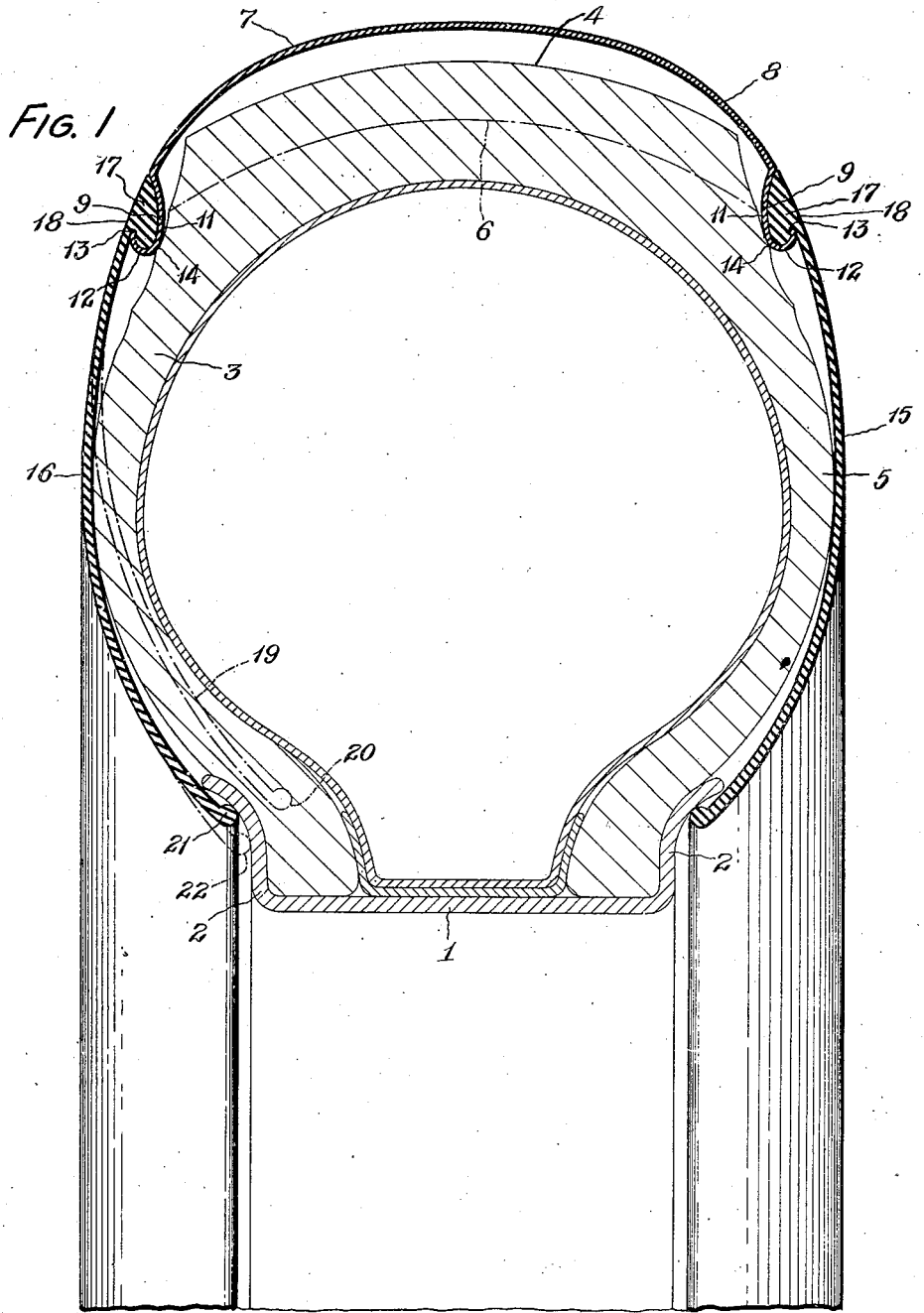

Referring now to the drawings in all of which like parts are designated by like reference characters, in Fig. 1 I have shown at 1 a tire rim having upstanding beads 2—2. A tire is shown in cross-section at 3 having a tread portion 4 and opposite rounded side walls as at 5. The tread indicated at 4 is of the outside diameter of the tire when new, and in broken lines at 6 is indicated its reduced diameter after wear.

At 7 is shown in cross-section the metal circumferential portion of a tire cover. It comprises an arcuate-shaped portion 8 disposed adjacent but preferably out of engagement with the tread portion and is formed to provide outwardly concave channels 9—9. The metal portion 8 is generally annular in form, but is not a complete annulus, being split as shown in Fig. 2 where the ends are indicated at 10—10, and the channels 9 are coextensive with the metal portion 7 in its annular direction.

The channels 9, in cross-section, are of such form that a back portion of the channel 11 rests upon the side of the tread or side of the tire, the back portion 11 being inwardly depressed from the arcuate-shaped portion 8, and inwardly radially, the back portions continue in upwardly concave portions 12 which terminate in upwardly directed edge portions 13—13. The back portions 11 engage or rest upon portions of the tire, as indicated at 14—14, which are inwardly radially of the tire beyond the minimum diameter 6 after the tire has worn, so that the metal portion 8 may at all times be supported by the tire wall on such portions 14, as illustrated.

The rubber portion of the tire cover of Fig. 1 is preferably of two parts, although as later explained, only one part may be employed. The rubber portions are shown generally at 15 and 16. The rubber part 16 comprises an annular bead 17 adapted to be disposed in the channel 9 at one side of the tire. The cross-sectional shape of the bead 17 and its continuation into the portion 16 are preferably such that a continuous unbroken surface 18 is obtained on the metal portion 8, and the rubber portion 16, when the bead 17 is in the channel 9.

Inwardly radially of the bead 17, the cover portion 16 is arcuate in cross-section, the relaxed normal shape being that indicated in broken lines at 19, where, as shown, it is inwardly concave and terminates inwardly radially in an annular bead 20. When the rubber portion 16 is in place on the tire and the bead 17 is in the channel 9, the bead 20 will take up the position shown at 21, where, as plainly illustrated in Fig. 1, it resiliently re-engages the outer surface of the bead 2 of the rim 1, and thus effectively seals the cover against the ingress of moisture, dirt, and the like.

The rubber portion 16 being generally a complete annulus thus completely covers the adjacent side of the tire. After the tire has worn to reduce the tread to the line 6, the bead 20 may take up an inwardly radial position illustrated at 22 and continues to effect a seal at that point, on bead 2 of the rim.

As will be understood, the annulus of the rubber portion 16 is resilient and in manufacture thereof the bead 17 is made of smaller diameter than the generally annular channel 9, so that in assembling the bead 17 into the channel as illustrated, the rubber portion is stretched to enlarge its diameter, and thus when the bead is in the channel, an inwardly radial constrictive resilient force is exerted on the bead at all parts thereof and thus the channel portion 9 of the metal rim 8 is forced inwardly radially against the wall of the tire at 14, with considerable resilient force.

It will be seen that the bead 20, being somewhat heavier than the rest of the side portion, is less resilient than the side portion, so that when the cover is positioned, as shown, on a tire of appropriate size, the bead 20 resists stretching and exerts a strong inward radial pull not only on the side portion but also on the rim 8 as well, and helps to keep the rim 8 in place and the side portion smooth and free of wrinkles.

The rubber portion of the cover 15 is generally similar to the portion 16 and has a similar or identical bead 17 engaging the other channel 9, and sealingly engages the rim 1 by the rubber bead 20. If desired, and as illustrated in Fig. 3, one of the cover portions 15 or 16 may be omitted.

In Fig. 3 the cover portion 16 only is shown, and the channel 9 on the other side of the tire is left empty. In this modification, the resilient radial constricting force of the cover portion 16 is sufficient to securely retain the metal portion of the cover 8 on the tire.

In the operation of the form of Fig. 1, to remove the tire cover, one of the cover portions 15 or 16 may first be removed by forcing the bead 17 out of the channel at one diametrical side thereof, whereupon the rest of the bead will readily slip out of the channel. The other cover portion may then similarly be removed and then the metal portion 8, may be slightly expanded by further separating the ends 10 thereof, and the same removed from the tire axially. The metal portion 8 being in a single piece and relatively light and easily handled may be carefully laid aside during the changing of the tire and may be put back on the other tire with the tire lying flat upon the ground, if desired, without liability of mutilating or denting or abrading the metal portion 8. And if desired, one of the rubber portions 16 may be applied to the metal portion to hold it on by means of the bead and channel with the tire lying on the ground. Then the tire may be turned over and allowed to rest upon the applied rubber portion while the other rubber portion is being stretched into place. But the metal portion 8 is at all times preserved against mutilation. In applying the rubber portions 15 and 16, the bead 17 may be laid in the channel 9 over the greater part of the circumference of the channel and then the last part, at one of the diameters thereof, may be forced into the channel in a well known manner.

The cover may employ two rubber side wall portions as shown at 15 and 16, Fig. 1, or may employ but a single side wall cover portion 16 as illustrated in Figs. 2 and 3. In either case such side wall portions may preferably be provided with integral rubber lugs 25, shown in Figs. 2 and 3, extending from the portion of the side wall cover portions 15 and/or 16, as the case may be, between the ends 10 of the circumferential metal portion 8. Such a lug is very efficacious in removing the bead 17 from the channel 9 of the metal portion 8, and also to interlock said bead and channel during assembly of the cover on a tire.

By the construction just described I provide a tire cover having rubber portions at the sides thereof sealing the rubber portions at the sides thereof in position to absorb without injury shocks of collision, and rough handling in changing the tire. I provide a cover which, by its inherent shape and resilience, seals itself on the tire and rim. Furthermore, I provide a tire cover in which a metal portion of band form may be disposed circumferentially of the tire and which may be finished with a brilliant luster and which may be securely mounted on the tire and resiliently maintained thereon by the resilience of the rubber side portions and which need not be inherently resilient itself, nor of the exact size of the tire inasmuch as it engages the tire only by the channel portions thereof, and which metal tire portion, not of itself being constrictingly resilient to grip the tire, may easily be removed therefrom and applied thereto.

The present application is a divisional application of my application Serial No. 552,636, filed July 23, 1931, and in which application, a tire cover made partly of rubber and partly of metal is disclosed contemplating clamping means to secure the ends of a split circumferential metal portion together.

Although I have shown and described embodiments of my invention I contemplate that numerous and extensive departures may be made therefrom without departing from the spirit of my invention and appended claims. Having thus described my invention, what I claim is:

1. A tire cover comprising a metal inwardly contractible strip for embracing a tire tread portion and an annular resiliently flexible rubber side portion joined thereto along an annular edge of the metal portion, said side portion being reinforced at its inner border and so dimensioned that when the cover is placed on a tire of appropriate size the inner border is subjected to a stretching tensile stress sufficient in degree to subject all other portions to a strong inwardly directed stretching pull communicated thereby to the said metal portion to hold the metal portion onto the tire.

2. A tire cover comprising a metal inwardly contractible strip for embracing a tire tread portion and a pair of annular resiliently flexible rubber side portions joined thereto at opposite annular edges of the metal portion, said side portions being reinforced at their inner borders and so dimensioned that when the cover is placed on a tire of appropriate size the inner borders are subjected to a stretching tensile stress sufficient in degree to subject all other portions to a strong inwardly directed stretching pull communicated thereby to the said metal portion to hold the metal portion onto the tire.

3. A tire cover comprising a split circumferential metal portion and an annular side portion of resiliently flexible material and joined thereto by longitudinally extending edges of said portions, said side portion being reinforced at its inner border and so dimensioned that when the cover is placed on a tire of appropriate size the inner border is subjected to a stretching tensile stress sufficient in degree to subject all other portions to a strong inwardly directed stretching pull communicated thereby to the said metal portion to hold the metal portion onto the tire.

4. A tire cover comprising a split metal circumferential portion and a pair of opposite rubber side portions inwardly radially contractible and joined thereto, said side portions being reinforced at their inner borders and so dimensioned that when the cover is placed on a tire of appropriate size the inner borders are subjected to a stretching tensile stress sufficient in degree to subject all other portions to a strong inwardly directed stretching pull communicated thereby to the said metal portion to hold the metal portion onto the tire.

5. A tire cover comprising a metal inwardly contractible strip for embracing a tire tread portion and an annular rubber side portion inwardly radially contractible, joined thereto at an externally flush annular joint, said side portion being reinforced at its inner border and so dimensioned that when the cover is placed on a tire of appropriate size the inner border is subjected to a stretching tensile stress sufficient in degree to subject all other portions to a strong inwardly directed stretching pull communicated thereby to the said metal portion to hold the metal portion onto the tire.

6. A tire cover comprising a metal inwardly contractible strip for embracing a tire tread portion, and a pair of opposite side portions of rubber inwardly radially contractible and joined to the circumferential portion at an outwardly flush surface annular joint, said side portions being reinforced at their inner borders and so dimensioned that when the cover is placed on a tire of appropriate size the inner borders are subjected to a stretching tensile stress sufficient in degree to subject all other portions to a strong inwardly directed stretching pull communicated thereby to the said metal portion to hold the metal portion onto the tire.

7. A tire cover comprising a split circumferential metal portion, a generally annular groove adjacent one edge thereof, and an inwardly radially contractible rubber side portion joined to the circumferential portion in said groove, said side portion being reinforced at its inner border and so dimensioned that when the cover is placed on a tire of appropriate size the inner border is subjected to a stretching tensile stress sufficient in degree to subject all other portions to a strong inwardly directed stretching pull communicated thereby to the said metal portion to hold the metal portion onto the tire.

8. A tire cover comprising a metal split circumferential portion, provided with grooves at its annular edges, and a pair of inwardly radially contractible rubber portions joined with the metal portion in said grooves, said side portions being reinforced at their inner borders and so dimensioned that when the cover is placed on a tire of appropriate size the inner borders are subjected to a stretching tensile stress sufficient in degree to subject all other portions to a strong inwardly directed stretching pull communicated thereby to the said metal portion to hold the metal portion onto the tire.

9. A tire cover comprising a split metal circumferential portion, provided at its opposite edges with annular grooves, and a pair of inwardly radially contractible annular rubber side portions joined to the circumferential portion at said grooves and exerting inwardly radially resilient constricting force thereon.

10. A tire cover comprising a circumferential split metal portion provided with a groove at its generally annular edge, and an annular rubber side portion provided with an annular bead of slightly less diameter than the groove and adapted to be externally expanded and snapped into the groove.

11. A tire cover comprising a split circumferential metal portion, provided with annular outwardly concave grooved lateral edges, the walls of the groove adapted to engage the tire inwardly of the tread, and an annular rubber inwardly radially contractible side portion adapted to be outwardly stretched and engaged with the groove.

12. A tire cover comprising a split circumferential metal tread covering portion, the annular edges engaging the tire on side portions thereof only, and an annular inwardly contractible rubber side covering portion engageable with the circumferential metal portion at its lateral annular edges, and constrictingly retaining it against the tire at its maximum diameter when new, and minimum diameter when worn.

13. A tire cover comprising a split circumferential metal tread covering portion, and an annular inwardly contractible rubber side covering portion adapted to be stretched and joined to the circumferential portion, and by its resilience frictionally engaging the cover with the tire.

14. A tire cover comprising a split circumferential metal tread covering portion, and an annular inwardly contractible rubber side covering portion adapted to be stretched and joined to the circumferential portion, and by its resilience frictionally engaging the circumferential portion with the tire.

15. A tire cover for vehicle spare tires comprising an inwardly contractible sheet metal strip embracing the tire tread, and tire side wall covering means, said means secured by an outer peripheral edge portion to a lateral edge of said strip and comprising a flexibly resilient sheet of rubber or like material having an inner edge portion more resistant to stretching than portions intermediate said edge portions, tensed to resiliently hold the cover onto the tire.

16. A tire cover comprising an inwardly contractible tire tread covering strip having relatively movable ends, and at least one annular tire side wall masking strip, said tread covering strip being substantially rigid but resilient, interlocking means for detachably securing longitudinally extending edges of the strips together, said wall masking strip being so dimensioned that when the cover is fitted in place on an appropriately sized tire the inner border of the strip will be subjected to tensile stress sufficient to cause said border to exert through other portions of the said annular strip a radial inward pull upon the secured edge of the tread covering strip to retain it in place over the tire tread.

17. A tire cover comprising an inwardly contractible sheet metal strip for embracing a tire tread, a pair of annular rubber strips each secured to and extending inwardly from opposite lateral edges of the metal strip, and each so formed that when the cover is fitted onto an appropriately sized tire its inner border is subjected to tensile stress sufficient to stretch other portions thereof transversely radially to exert an inward pull on the metal strip.

18. The tire cover substantially as set forth in claim 17, characterized by said wall masking strip extending axially and radially inwardly towards the reduced tire base portion.

19. The tire cover substantially as defined in claim 17, characterized by each rubber strip being preformed to transversely concavo-convex form to generally conform to the form of the outer surfaces of a tire side wall.

20. The tire cover substantially as defined in claim 17, characterized by each rubber strip being preformed to transversely concavo-convex form to generally conform to the form of the outer surfaces of a tire side wall, the inner border portions of said strips terminating in reinforcing beads.

OSCAR U. ZERK.